Nov. 8, 1932.  J. F. SEELBACH  1,886,431
PULLEY WHEEL FOR SASH PULLEYS
Filed May 17, 1929

INVENTOR
John F. Seelbach
BY Chappell & Earl
ATTORNEYS

Patented Nov. 8, 1932

1,886,431

UNITED STATES PATENT OFFICE

JOHN F. SEELBACH, OF GRAND RAPIDS, MICHIGAN, ASSIGNOR TO GRAND RAPIDS HARDWARE CO., OF GRAND RAPIDS, MICHIGAN

PULLEY WHEEL FOR SASH PULLEYS

Application filed May 17, 1929. Serial No. 363,935.

The object of the invention is to provide a simple and strong sheet metal pulley with wood bushing or center.

Objects pertaining to details will appear from a description to follow. A preferred embodiment of my invention is clearly illustrated in the accompanying drawing, in which.

Figure 1:
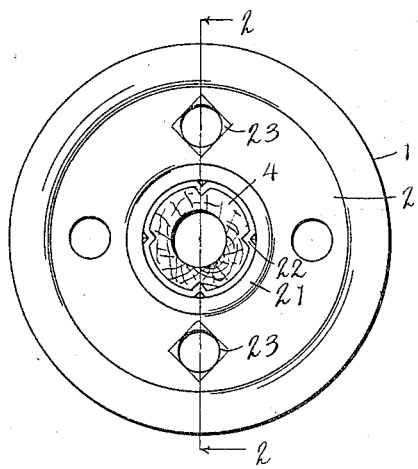
Fig. 1 is a side view of my improved sash pulley.
Figure 2:
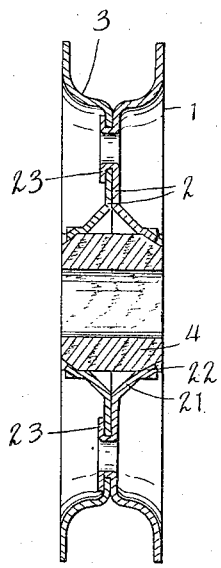
Fig. 2 is an enlarged vertical section on line 2—2 of Fig. 1.
Figure 3:
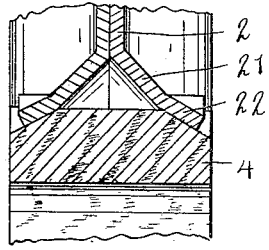
Fig. 3 is an enlarged detail sectional view of the means for securing the bushing to the pulley, as seen in Fig. 2.

The parts will be identified by their numerals of reference which are the same in all the views.

1 is my improved sash pulley comprising a pair of disks 2. 21 is the hub therefor. 4 is the wood bushing. 22 are V-shaped indentations struck in the hub to indent and engage the bushing. 23 are the struck up joints between the disks. 3 is the pulley groove.

From this description it is clear that I have produced a very simple wood center wheel. The bushing, however, is effectively retained against rotation or end displacement. As the bushing slightly projects beyond the hub, an effective smooth thrust bearing surface is secured.

Having thus described my invention, what I claim as new and desire to secure by Letters Patent, is:

A pulley wheel for sash pulleys of sheet metal, comprising symmetrical halves conformed to form a groove and expanded to form a hub having cylindrical bushing-engaging sleeves, and a cylindrical wood bushing of right cylindrical form within the said hub projecting at each side and retained by indenting with angular V-shaped depressions the sheet metal wall of the said hub into the fiber of the wood at each end, the said indentations retaining said bushing centrally in place.

In witness whereof I have hereunto set my hand.

JOHN F. SEELBACH.